(12) United States Patent
Ayuzawa

(10) Patent No.: US 10,173,726 B2
(45) Date of Patent: Jan. 8, 2019

(54) VEHICLE BODY STRUCTURE OF AUTOMOBILE

(71) Applicant: HONDA MOTOR CO., LTD., Tokyo (JP)

(72) Inventor: Shotaro Ayuzawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/491,033

(22) Filed: Apr. 19, 2017

(65) Prior Publication Data

US 2017/0297632 A1 Oct. 19, 2017

(30) Foreign Application Priority Data

Apr. 19, 2016 (JP) ................................ 2016-083534

(51) Int. Cl.
*B62D 27/02* (2006.01)
*B62D 25/20* (2006.01)
*B62D 21/11* (2006.01)
*B62D 29/00* (2006.01)
*B62D 29/04* (2006.01)

(52) U.S. Cl.
CPC .......... *B62D 21/11* (2013.01); *B62D 25/2036* (2013.01); *B62D 25/2045* (2013.01); *B62D 29/005* (2013.01); *B62D 29/043* (2013.01)

(58) Field of Classification Search
CPC .. B62D 25/04; B62D 25/025; B62D 25/2036; B62D 27/023; B62D 25/082; B62D 25/2027; B62D 25/20
USPC .............. 293/30, 29, 203.03, 204, 209, 210, 293/190.08, 146.15, 56, 63, 68.1; 280/781, 785, 107, 801.1, 800, 797, 788
See application file for complete search history.

(56) References Cited

U.S. PATENT DOCUMENTS

| 8,720,985 B2* | 5/2014 | Izumi | B62D 25/025 |
| | | | 296/187.12 |
| 9,132,859 B2* | 9/2015 | Yamaji | B62D 25/00 |
| 2013/0313863 A1* | 11/2013 | Yamaji | B62D 25/00 |
| | | | 296/203.01 |

(Continued)

FOREIGN PATENT DOCUMENTS

JP 4853315 B2 1/2012
JP 2014-918 A 1/2014

OTHER PUBLICATIONS

Office Action dated Sep. 20, 2017, issued in counterpart Japanese Application No. 2016-083534, with English machine translation. (6 pages).

*Primary Examiner* — D Glenn Dayoan
*Assistant Examiner* — Sunsurraye Westbrook
(74) *Attorney, Agent, or Firm* — Westerman, Hattori, Daniels & Adrian, LLP

(57) ABSTRACT

Since a recess 11*f* configured to house an in-vehicle component 37 is formed on an outer surface of a first wall portion 11*c* of a FRP vehicle body panel 24, a metallic reinforcing member 32 is fitted to the recess 11*f* and is fixed by adhesive, the reinforcing member 32 can compensate for a decrease in strength of the first wall portion 11*c* caused by the recess 11*f*. Since an outer peripheral portion of the reinforcing member 32 is mechanically fastened to the vehicle body panel 24 with rivets 33 and 35, the outer peripheral portion serving as a starting point of peeling of an adhesive is reinforced by mechanical fastening so that the vehicle body panel 24 and the reinforcing member 32 can be firmly integrated.

8 Claims, 6 Drawing Sheets

(56) References Cited

U.S. PATENT DOCUMENTS

2014/0300141 A1* 10/2014 Hihara .................. B62D 25/20
296/193.07

\* cited by examiner

VEHICLE BODY STRUCTURE OF AUTOMOBILE

CROSS-REFERENCE OF RELATED APPLICATION

This application claims priority of Japanese Patent Application No. 2016-083534 filed in Japan on Apr. 19, 2016, the entire contents of which are incorporated herein by reference.

TECHNICAL FIELD

The present invention relates to a vehicle body structure of an automobile for firmly joining a metallic reinforcing member to an FRP vehicle body panel.

BACKGROUND OF THE INVENTION

Japanese patent No. 4853315 described below discloses a reinforced configuration in which a truncated conical through-hole is famed in a closed section member famed by coupling a first FRP member and a second FRP member, and a third truncated conical member made of FRP is stuck to an opening of the through-hole.

However, in the above-described prior art, since only a part of the third member was stuck to the first and second members, there was a problem that the reinforcing effect provided by sticking of the third member was not sufficiently exhibited.

SUMMARY OF INVENTION

The present invention has been made in view of the above circumstances, and an object thereof is to firmly join a metallic member to a member made of FRP.

In order to achieve the above object, according to a first embodiment of the present invention, there is provided a vehicle body structure of an automobile in which a recess configured to house an in-vehicle component is formed on an outer surface of a first wall portion of a FRP vehicle body panel, a metallic reinforcing member is fitted to the recess and is fixed by adhesive, and an outer peripheral portion of the reinforcing member is mechanically fastened to the vehicle body panel.

Further, according to a second embodiment of the invention, in addition to the configuration of the first embodiment, there is provided the vehicle body structure of an automobile, wherein the vehicle body panel comprises a second wall portion which intersects with the first wall portion, and the reinforcing member comprises a main body portion fitted to the recess of the first wall portion, an extension wall which is bent from the main body portion via a corner portion and extends along the second wall portion, and a first mechanical fastening portion which protrudes from the extension wall beyond the corner portion.

Further, according to a third embodiment of the invention, in addition to the configuration of the second embodiment, there is provided the vehicle body structure of an automobile, wherein the first mechanical fastening portion and the corner portion are connected by a rib.

Further, according to a fourth embodiment of the invention, in addition to the configuration of any one of the first to third embodiments, there is provided the vehicle body structure of an automobile, wherein a metallic insert member is disposed inside the vehicle body panel, and the vehicle body panel is sandwiched between the reinforcing member and the insert member.

Further, according to a fifth embodiment of the invention, in addition to the configuration of any one of the first to fourth embodiments, there is provided the vehicle body structure of an automobile, wherein the vehicle body panel is an outer skin which constitutes the outer surface of the floor panel, and the floor panel is configured to sandwich cores between the outer skin and the inner skin.

Further, according to the sixth embodiment of the invention, in addition to the configuration of the second or third embodiment, there is provided the vehicle body structure of an automobile, further comprising:

a metal frame joined to a front portion of the vehicle body panel, wherein the reinforcing member houses a mount portion of a suspension arm which is the in-vehicle component, an outer portion of the mount portion in the vehicle width direction is fastened to the first mechanical fastening portion, and an inner portion of the mount portion in the vehicle width direction is fastened to a second mechanical fastening portion provided in the metal frame.

A floor inclined portion $11c$ of the embodiment corresponds to a first wall portion of the present invention, a floor side wall portion $11e$ of the embodiment corresponds to a second wall portion of the present invention, a front subframe 21 corresponds to a metal frame of the present invention, a female screw portion $22a$ of the embodiment corresponds to a second mechanical fastening portion of the present invention, an outer skin 24 of the embodiment corresponds to a vehicle body panel of the embodiment, a metal collar 28 of the embodiment corresponds to an insert member of the present invention, a boss portion $32e$ of the embodiment corresponds to a first mechanical fastening portion of the present invention, a suspension arm 37 of the embodiment corresponds to an in-vehicle component of the present invention, and a bracket 40 of the embodiment corresponds to a mount portion of the present invention.

Effect of the Invention

According to the configuration of the first embodiment, since a recess configured to house an in-vehicle component is formed on an outer surface of a first wall portion of a FRP vehicle body panel, and a metallic reinforcing member is fitted to the recess and is fixed by adhesive, the reinforcing member can compensate for a decrease in strength of the first wall portion caused by the recess. Since an outer peripheral portion of the reinforcing member is mechanically fastened to the vehicle body panel with rivets, the outer peripheral portion serving as a starting point of peeling of an adhesive is reinforced by mechanical fastening so that the vehicle body panel and the reinforcing member can be firmly integrated.

According to the configuration of the second embodiment, the vehicle body panel includes a second wall portion which intersects with the first wall portion, and the reinforcing member includes a main body portion fitted to the recess of the first wall portion, an extension wall which is bent from the main body portion via a corner portion and extends along the second wall portion, and a first mechanical fastening portion which protrudes from the extension wall beyond the corner portion. Accordingly, by transmitting the load, which is input to the first mechanical fastening portion, to the first wall portion from the main body portion, and by transmitting and dispersing the load to the second wall portion from the first mechanical fastening portion via the corner portion and the extension wall, it is possible to prevent deformation and breakage of the reinforcing member.

According to the configuration of the third embodiment, since the first mechanical fastening portion and the corner portion are connected by a rib, it is more effectively disperse some of the load, which is input to the first mechanical fastening portion, into the corner portion via the rib.

According to the configuration of the fourth embodiment, since a metallic insert member is disposed inside the vehicle body panel, and the vehicle body panel is sandwiched between the reinforcing member and the insert member, by enhancing the rigidity of the vehicle panel with the insert member, it is possible to prevent peeling of the adhesive that sticks the reinforcing member to the recess of the first wall portion.

According to the configuration of the fifth embodiment, since the vehicle body panel is an outer skin which constitutes the outer surface of the floor panel, and the floor panel is configured to sandwich cores between the outer skin and the inner skin, it is possible to enhance the rigidity of the floor panel by the cores and to secure a space which forms the recess inside the floor panel.

According to the configuration of the sixth embodiment, the vehicle body structure of an automobile further includes a metal frame joined to a front portion of the vehicle body panel, wherein the reinforcing member houses a mount portion of a suspension arm which is the in-vehicle component, an outer portion of the mount portion in the vehicle width direction is fastened to the first mechanical fastening portion, and an inner portion of the mount portion in the vehicle width direction is fastened to a second mechanical fastening portion provided in the metal frame. Accordingly, it is possible to fully support the suspension arm by the vehicle body panel.

DETAILED DESCRIPTION OF THE INVENTION

Embodiments of the present invention will be described below with reference to FIGS. 1 to 6. In the present specification, a front-rear direction, a left-right direction (a vehicle width direction) and an up-down direction are defined on the basis of an occupant seated in the driver's seat.

Figure 1:
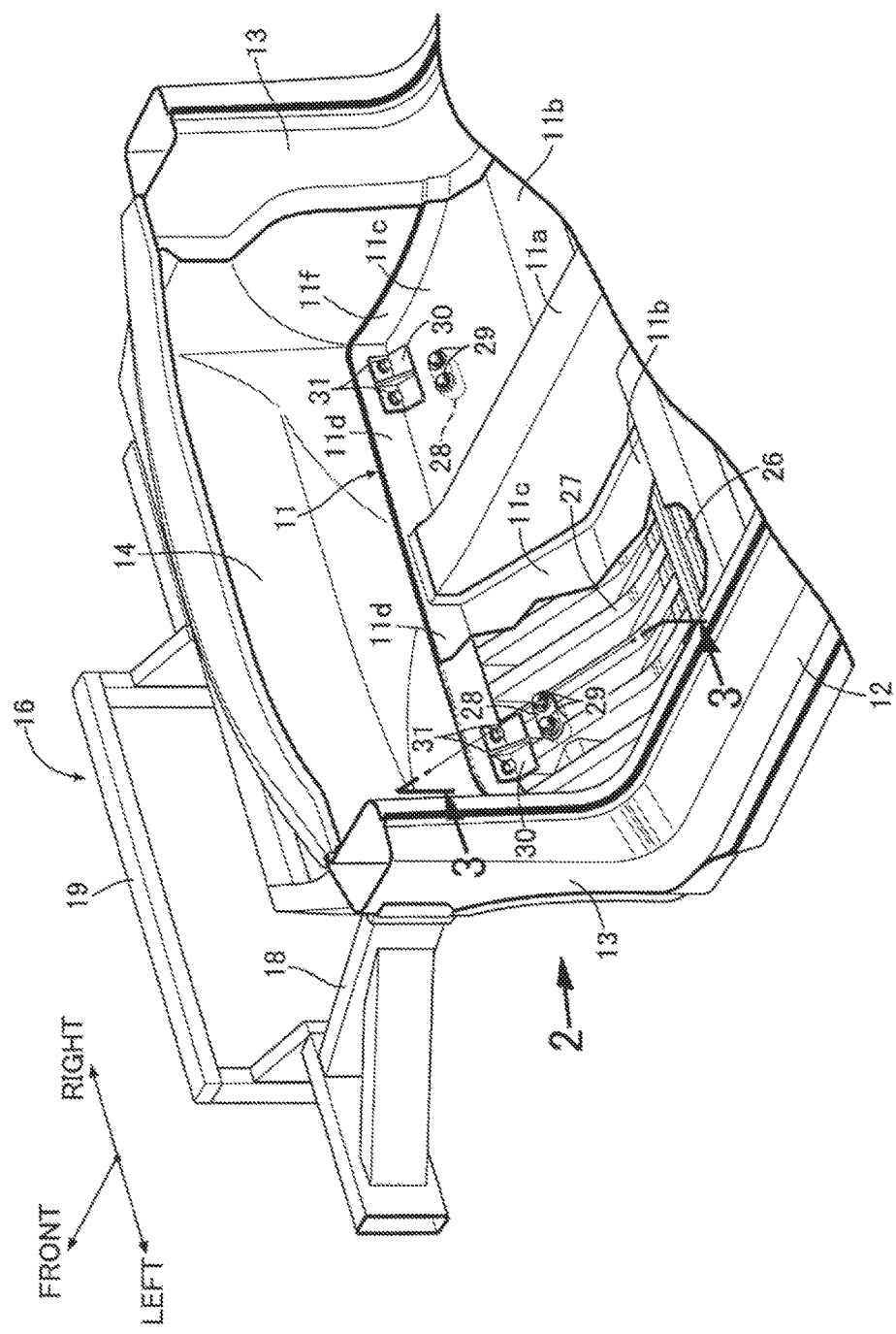
FIG. 1 is a perspective view of a front portion of a vehicle body of an automobile.
Figure 2:
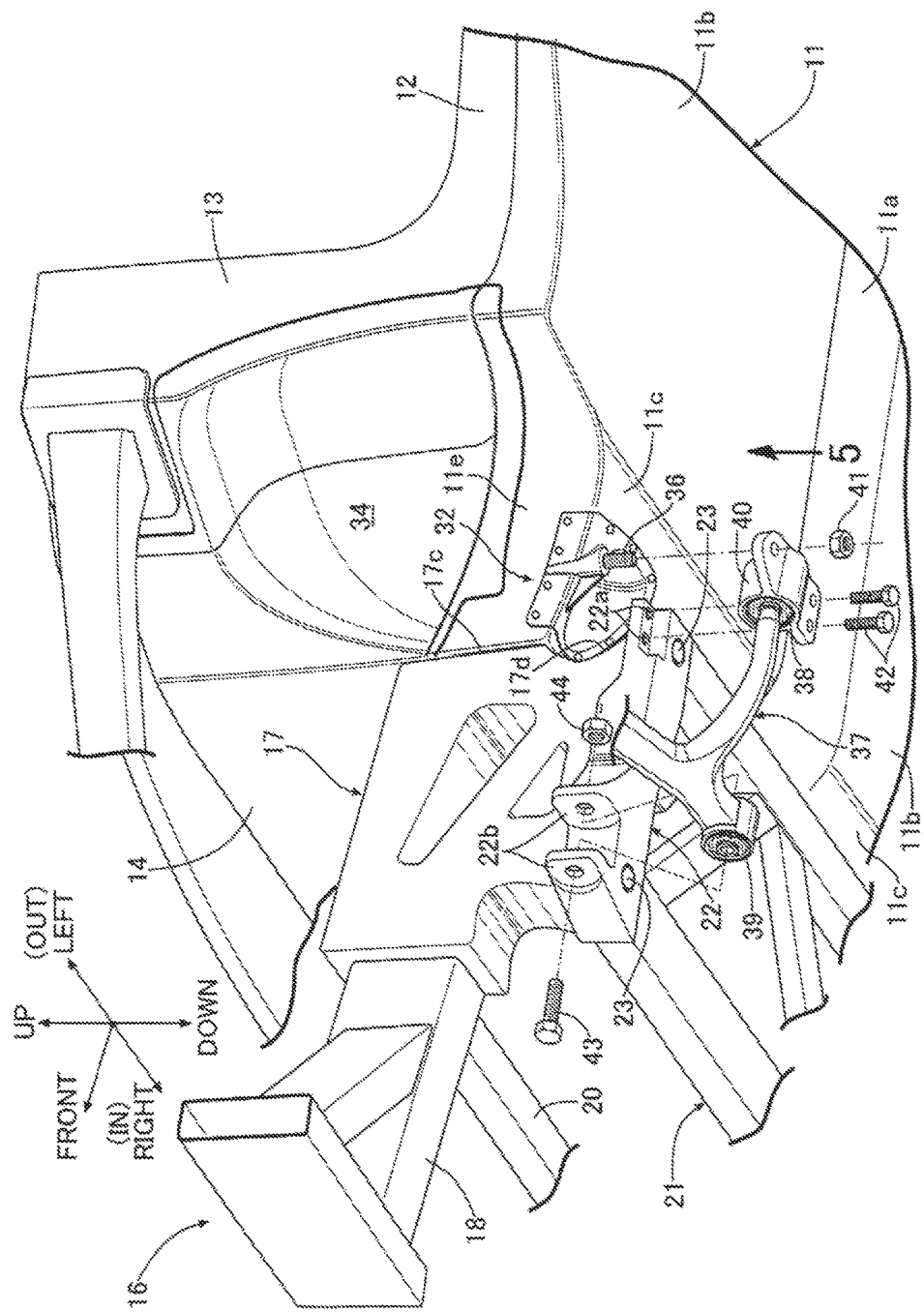
FIG. 2 is a diagram taken from an arrow 2 of FIG. 1.

As illustrated in FIGS. 1 and 2, an vehicle body of an automobile basically made of carbon fiber reinforced resin (CFRP) has a floor panel 11, a pair of left and right side sills 12 and 12 extending in the front-rear direction along both side edges of the floor panel 11 in the vehicle width direction, a pair of left and right front pillar lower portions 13 and 13 standing up from the front ends of the left and right side sills 12 and 12, and a dash panel lower portion 14 which stands up from the front end of the floor panel 11 to connect the left and right front pillar lower portions 13 and 13. Each of the above members is made of CFRP.

A metallic frame member 16 attached to the front end of the floor panel 11 includes a pair of left and right frame attachment portions 17 and 17, a pair of left and right front side frames 18 and 18 extending forward from front ends of the left and right frame attachment portions 17 and 17, a front bulkhead 19 having a rectangular frame shape for connecting the front ends of the left and right front side frames 18 and 18, and a cross member 20 which connects the front ends of the left and right frame attachment portions 17 and 17 in the vehicle width direction.

Figure 3:
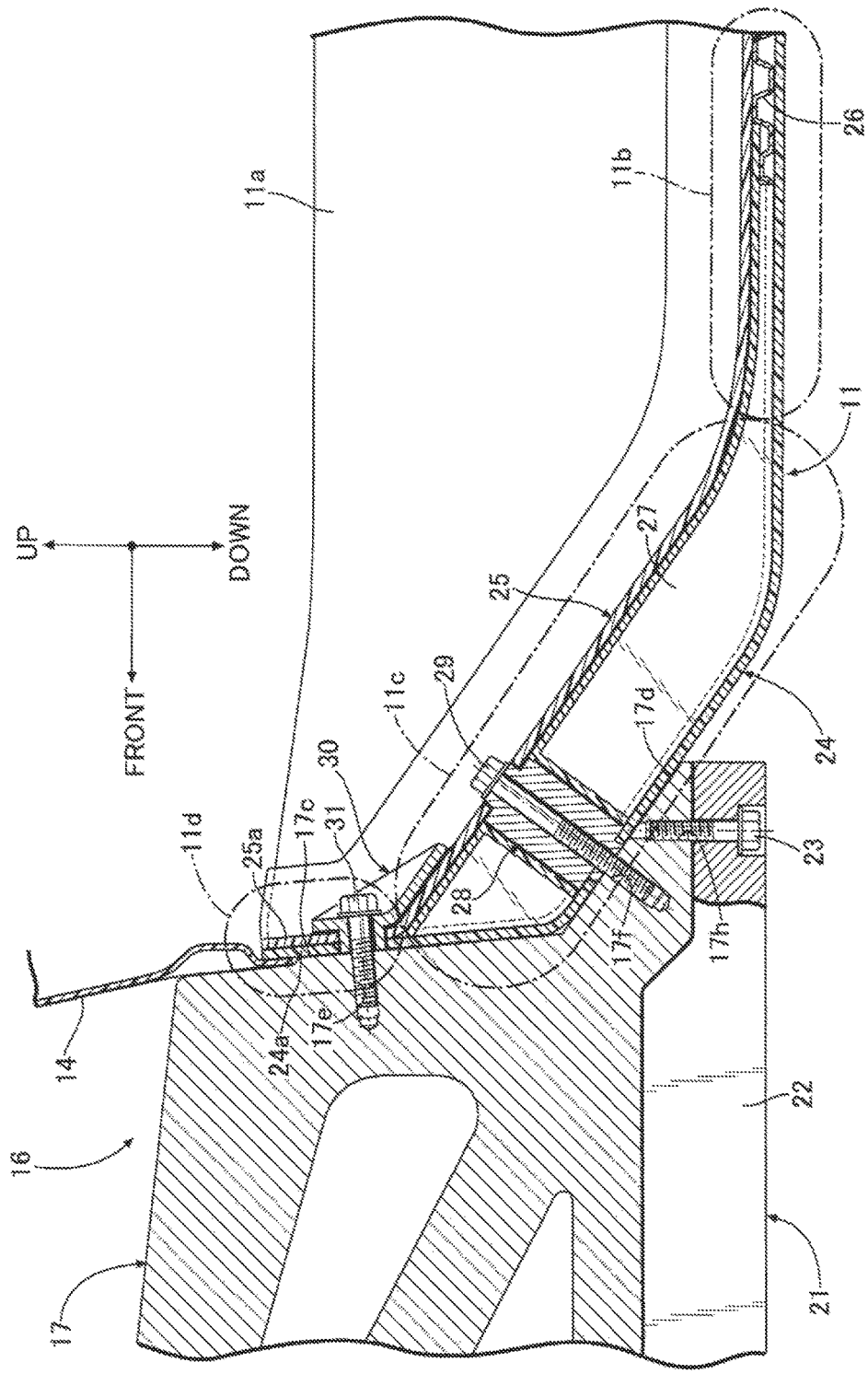
FIG. 3 is a cross-sectional view taken along a line 3-3 of FIG. 1.
Figure 4:
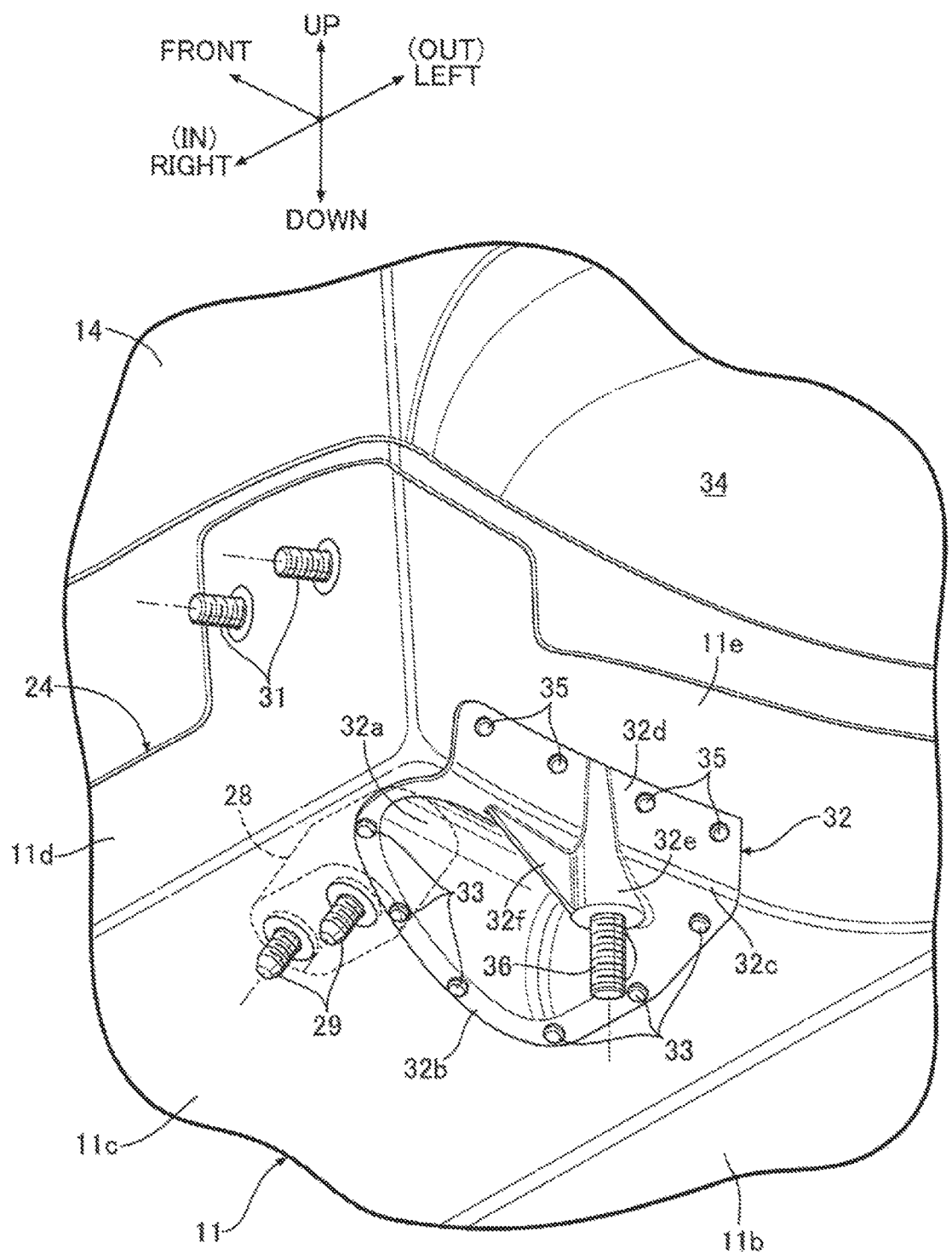
FIG. 4 is an enlarged view of a main part of FIG. 2.
Figure 5:
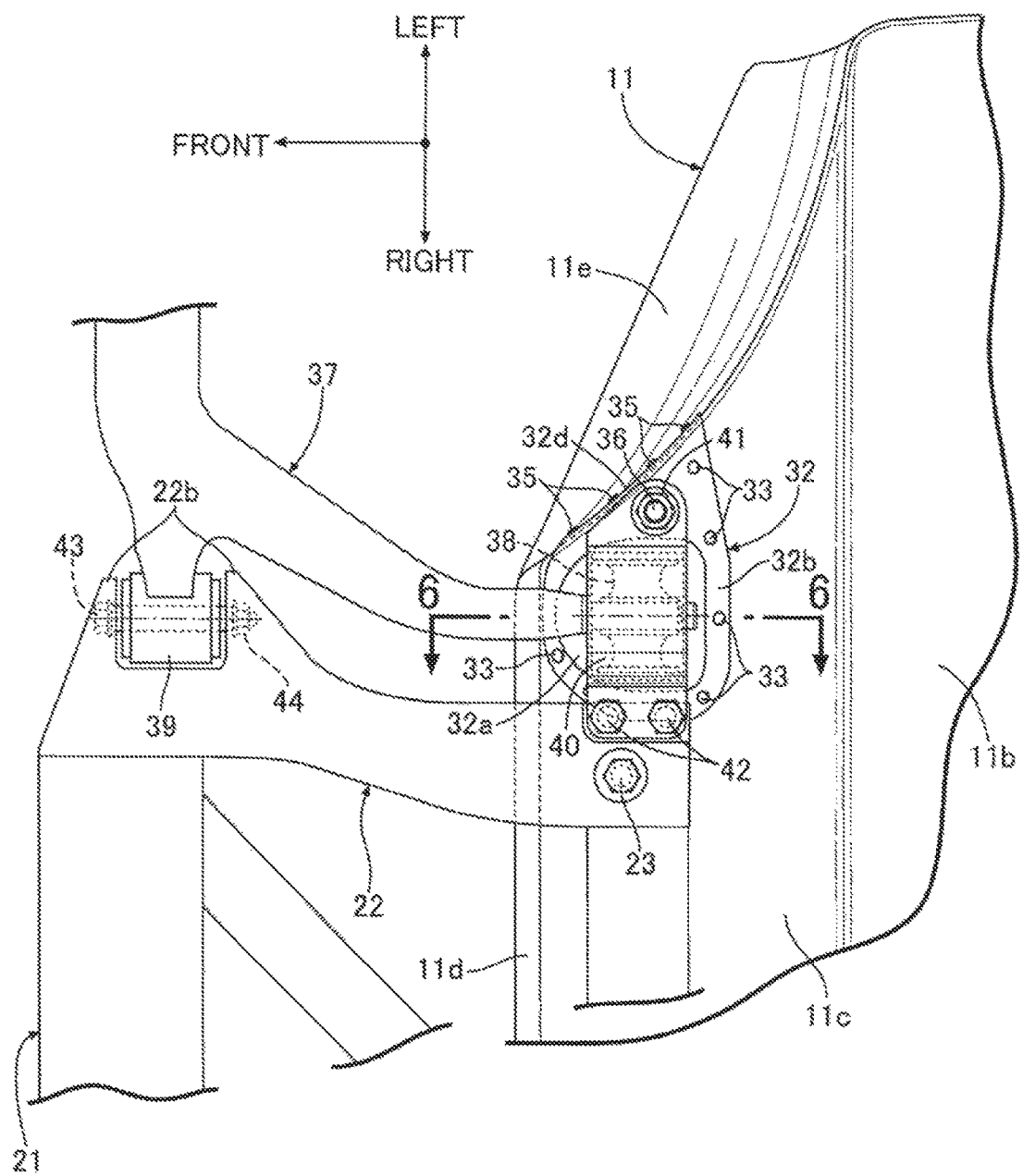
FIG. 5 is a diagram taken from an arrow 5 of FIG. 2.
Figure 6:
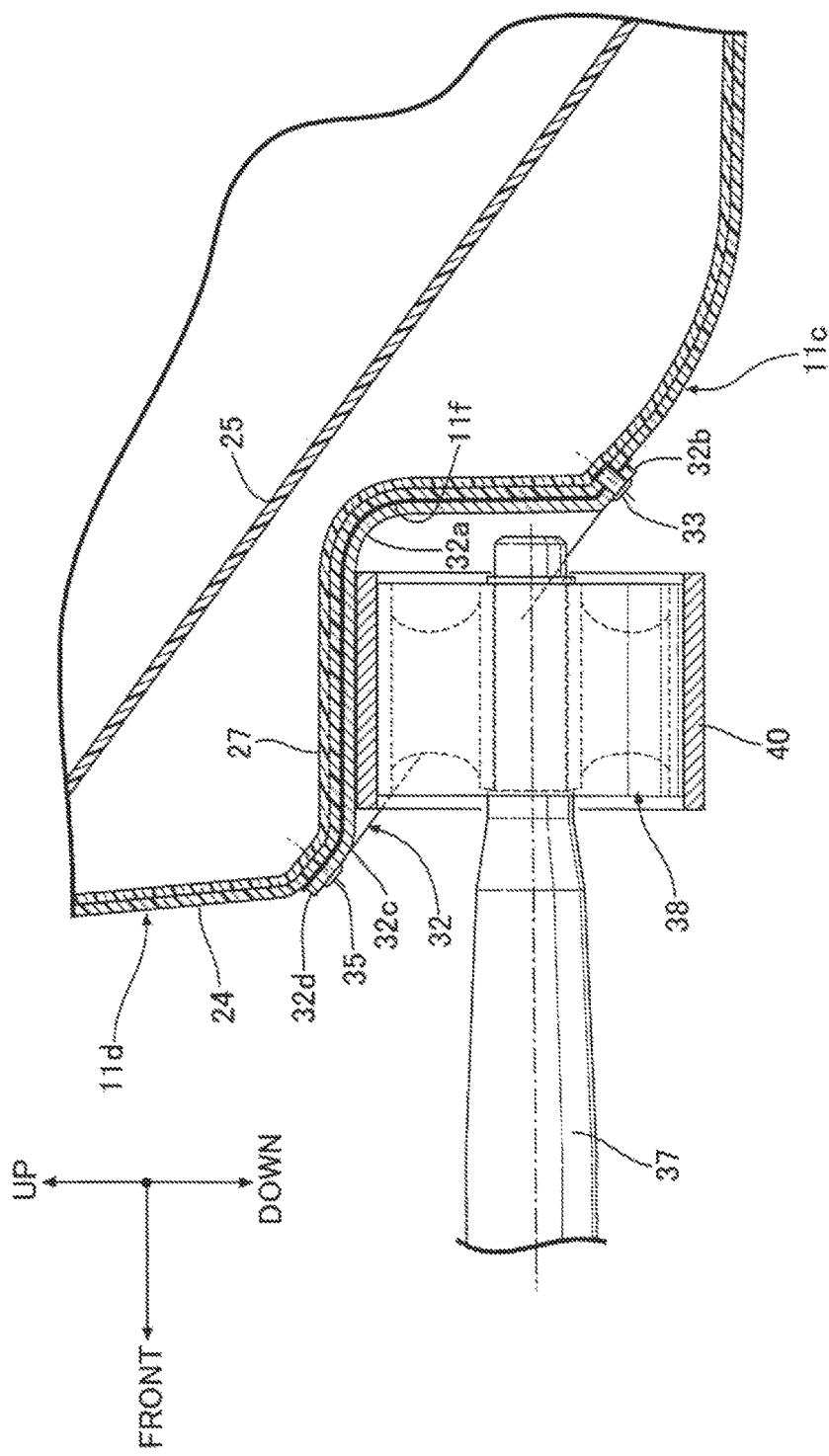
FIG. 6 is a cross-sectional view taken along a line 6-6 of FIG. 5.

As illustrated in FIGS. 2 and 3, a flat frame upright portion 17c extending in the up-down direction is formed at the rear end of the frame attachment portion 17, and a flat frame inclined portion 17d extends rearward and downward from the lower end of the frame upright portion 17c. Two left and right female screw portions 17e and 17e are formed in the frame upright portion 17c, and two left and right female screw portions 17f and 17f are formed in the frame inclined portion 17d.

The rectangular frame-shaped front sub-frame 21 includes a pair of left and right vertical members 22 and 22 extending in the front-rear direction, and by screwing the two bolts 23 and 23 penetrating the front end and the rear end of the vertical member 22 from the bottom to the top with the female screw portions 17h and 17h formed at the front end and the rear end of the lower surface of the frame attachment portion 17, the front sub-frame 21 is fixed to the lower surfaces of the left and right frame attachment portions 17 and 17.

As illustrated in FIG. 3, the floor panel 11 is constituted by sticking the lower outer skin 24 and the upper inner skin 25 with joining flanges 24a and 25a on an outer periphery thereof, and has a floor flat portion 11b with a floor tunnel 11a famed at a central portion in the vehicle width direction and extending in the front-rear direction, a floor inclined portion 11c standing obliquely forward and upward from the front end of the floor flat portion 11b, and a floor upright portion 11d which stands upward from the front end of the floor inclined portion 11c and is connected to the lower end of the dash panel lower portion 14.

The floor flat portion 11b has a sandwich structure in which a corrugated core 26 is sandwiched between the outer skin 24 and the inner skin 25. The floor inclined portion 11c also has a sandwich structure in which a corrugated core 27 is sandwiched between the outer skin 24 and the inner skin 25. The floor upright portion 11d is configured to include joining flanges 24a and 25a of the outer skin 24 and the inner skin 25 joined by adhesion, and is a solid structure having no core.

As illustrated in FIGS. 1 and 3, a metal collar 28 is embedded in the floor inclined portion 11c of the floor panel 11 by adhesion. The two bolts 29 and 29 penetrating the metal collar 28 from the top to the bottom are screwed into the female screw portions 17f and 17f of the frame inclined portion 17d of the frame attachment portion 17, and thus, the upper surface of the frame inclined portion 17d is fastened to the lower surface of the floor inclined portion 11c.

The metal plate 30 is fixed by adhesion so as to straddle from the rear surface of the inner skin 25 of the floor upright portion 11d to the upper portion of the rear surface of the inner skin 25 of the floor inclined portion 11c. When the two bolts 31 and 31 penetrating the metal plate 30 from the rear to the front are screwed with the female screw portions 17e and 17e of the frame upright portion 17c of the frame attachment portion 17, the rear surface of the frame upright portion 17c is fastened to the front surface of the floor upright portion 11d.

As illustrated in FIGS. 2 and 4 to 6, a reinforcing member 32 formed of an aluminum alloy into a cup shape is fitted to a recess 11f (see FIG. 6) formed at an outer end in the vehicle width direction of the floor inclined portion 11c of the floor panel 11, and is fixed to the recess 11f by adhesion. The reinforcing member 32 includes a main body portion 32a fitted to the recess 11f of the floor inclined portion 11c, a flange 32b formed on the outer periphery of the main body portion 32a, and an extension wall 32d bent substantially at a right angle from the main body portion 32a via a corner portion 32c. The flange 32b is fastened to the floor inclined portion 11c with a plurality of rivets 33, and the extension wall 32d is fastened to the floor side wall portion 11e, which stands upward from the floor inclined portion 11c to constitute a part of a wheel house 34, with a plurality of rivets 35. Further, the reinforcing member 32 includes a boss portion 32e which protrudes downward from the extension wall 32d beyond the corner portion 32c, and a stud bolt 36 protrudes downward from the lower surface of the boss portion 32e. The side wall of the boss portion 32e and the corner portion 32c are connected by a triangular rib 32f.

Two female screw portions 22a and 22a (see FIG. 2) are formed at the rear end of the vertical member 22 of the front sub-frame 21, and a pair of brackets 22b and 22b projecting outward in the vehicle width direction are formed at the front end.

Rubber bush joints 38 and 39 are provided in each of two divided base end portions of a suspension arm 37 which supports the front wheels so as to freely move up and down. The outer end in the vehicle width direction of the bracket 40 for supporting the outer periphery of the rear rubber bush joint 38 is fitted to the stud bolt 36 of the reinforcing member 32 and is fastened by the nut 41. Two bolts 42 and 42 penetrating the inner end in the vehicle width direction are screwed with female screw portions 22a and 22a provided in the vertical member 22 of the front sub-frame 21. The front rubber bush joint 39 of the suspension arm 37 is supported between the pair of brackets 22b and 22b of the vertical member 22 of the front sub-frame 21 with a bolt 43 and a nut 44.

The reinforcing member 32 fixed to the outer surface of the outer skin 24 of the floor inclined portion 11c partly overlaps the metal collar 28 fixed to the inner surface (see FIG. 4), and the outer skin 24 is interposed between the reinforcing member 32 and the metal collar 28.

Next, the operation of the embodiment of the present invention having the above configuration will be described.

Since the metallic reinforcing member 32 is fitted to the recess 11f (see FIG. 6) formed on the outer surface of the outer skin 24 of the CFRP floor panel 11 and is fixed by the adhesive, the strength reduction of the outer skin 24 caused by the recess 11f can be compensated by the reinforcing member 32. Further, since the flange 32b and the extension wall 32d, which are the outer peripheral portions of the reinforcing member 32, are fastened to the outer skin 24 with the rivets 33 and 35, the outer peripheral portion of the reinforcing member 32 serving as a starting point of peeling of adhesive can be reinforced by mechanical fastening, and the outer skin 24 and the reinforcing member 32 can be fully integrated.

Further, the floor panel 11 includes the floor side wall portion 11e which intersects with the floor inclined portion 11c at a substantially right angle. The reinforcing member 32 includes the main body portion 32a fitted to the recess 11f of the floor inclined portion 11c, the extension wall 32d which is bent from the main body portion 32a via the corner portion 32c and extends along the floor side wall portion 11e, and the boss portion 32e which projects from the extension wall 32d beyond the corner portion 32c. Accordingly, by transmitting the load, which is input from the suspension arm 37 to the boss portion 32e, to the floor inclined portion 11c from the main body portion 32a, and by transmitting and dispersing the load to the floor side wall portion 11e from the boss portion 32e via the corner portion 32c and the extension wall 32d, it is possible to prevent defamation and breakage of the reinforcing member 32.

Further, since the boss portion 32e and the corner portion 32c of the reinforcing member 32 are connected by the rib 32f, it is more effectively disperse some of the load, which is input to the boss portion 32e, into the corner portion 32c via the rib 32f.

Further, since the metal collar 28 is disposed inside the outer skin 24 and the outer skin 24 is sandwiched between the reinforcing member 32 and the metal collar 28 (see FIG. 4), by enhancing the rigidity of the outer skin 24 with the metal collar 28, it is possible to prevent peeling of the adhesive that sticks the reinforcing member 32 to the recess 11f of the outer skin 24.

Further, since the floor panel 11 is configured to sandwich the cores 26 and 27 between the outer skin 24 and the inner skin 25, it is possible to enhance the rigidity of the floor panel 11 by the cores 26 and 27 and to secure a space which forms the recess 11f inside the floor panel 11.

The reinforcing member 32 houses the rear rubber bush joint 38 of the suspension arm 37. The outer portion in the vehicle width direction of the bracket 40 which supports the rubber bush joint 38 is fastened to the stud bolt 36 of the boss portion 32e of the reinforcing member 32. The inner portion of the bracket 40 in the vehicle width direction is fastened to the female screw portions 22a and 22a provided in the front sub-frame 21. Accordingly, it is possible to firmly support the suspension arm 37 by the floor inclined portion 11c.

Although the embodiment of the present invention has been described above, various design changes can be made within the scope that does not depart from the spirit of the present invention.

For example, although the reinforcing member 32 includes the stud bolt 36 in the embodiment, a female screw portion may be provided instead of the stud bolt 36.

Further, the in-vehicle component of the present invention is not limited to the suspension arm 37 of the embodiment.

Further, the FRP of the present invention is not limited to the CFRP of the embodiment, and may be another kind of FRP such as glass fiber reinforced resin (GFRP).

DESCRIPTION OF REFERENCE NUMERALS 11 floor panel
11c floor inclined portion (first wall portion)
11e floor side wall portion (second wall portion)
11f recess
21 front sub-frame (metal frame)
22a female screw portion (second mechanical fastening portion)
24 outer skin (vehicle body panel)
25 inner skin
26 core
27 core
28 metal color (insert member)
32 reinforcing member 32a main body portion
32c corner portion
32d extension wall
32e boss portion (first mechanical fastening portion)
32f rib
37 suspension arm (in-vehicle component)
40 bracket (mount portion)

The invention claimed is:

1. A vehicle body structure of an automobile, comprising:
   a vehicle body panel made of a fiber reinforced resin and having a first wall portion which has an outer surface and a recess formed on the outer surface, the recess being configured to house a mount portion of a suspension arm; and
   a metallic reinforcing member fitted to said recess and fixed by adhesive, an outer peripheral portion of said reinforcing member being mechanically fastened to said vehicle body panel.

2. The vehicle body structure of the automobile according to claim 1, wherein said vehicle body panel comprises a second wall portion which intersects with said first wall portion, and
   wherein said reinforcing member comprises,
      a main body portion fitted to the recess of said first wall portion,
      a corner portion formed along the intersection between the first and second wall portions,
      an extension wall which is bent from said main body portion via the corner portion and extends along said second wall portion, and
      a first mechanical fastening portion which protrudes from said extension wall beyond said corner portion.

3. The vehicle body structure of the automobile according to claim 2, further comprising a rib which connects said first mechanical fastening portion and said corner portion.

4. The vehicle body structure of the automobile according to claim 1, further comprising a metallic insert member disposed inside said vehicle body panel, said vehicle body panel being sandwiched between said reinforcing member and said insert member.

5. The vehicle body structure of the automobile according to claim 1, wherein said vehicle body panel is an outer skin which constitutes the outer surface of the floor panel, and said floor panel is configured to sandwich cores between said outer skin and an inner skin.

6. The vehicle body structure of the automobile according to claim 2, further comprising:
   a metal frame joined to a front portion of said vehicle body panel, wherein
      said mount portion of is a bracket which supports an outer periphery of a rubber bush joint of the suspension arm, said reinforcing member housing the bracket of the suspension arm,
      an outer portion of said mount portion in the vehicle width direction is fastened to said first mechanical fastening portion, and
      an inner portion of said mount portion in the vehicle width direction is fastened to a second mechanical fastening portion provided in said metal frame.

7. The vehicle body structure according to claim 1, wherein
   the first wall portion of the vehicle floor body panel is a floor inclined wall portion, the recess being formed on an outer surface of the floor inclined wall portion at one end side thereof in an vehicle width direction;
   the metallic reinforcing member is formed of an aluminum alloy and has a cup-shaped body fitted to said recess and fixed by adhesive and a flange at an outer periphery of the cup-shaped body, the flange being mechanically fastened to said the floor inclined wall portion of said vehicle floor body panel with a plurality of rivets.

8. A vehicle body structure of an automobile, comprising:
   a vehicle body panel comprising a recess formed on an outer surface of the vehicle floor body panel and configured to house therein an in-vehicle component;
   a metallic reinforcing member having a cup-shaped body which is fitted to said recess and fixed by adhesive and a flange at an outer periphery portion of the cup-shaped body which is mechanically fastened to said vehicle body panel.

* * * * *